(12) United States Patent
Fogt et al.

(10) Patent No.: US 9,638,036 B2
(45) Date of Patent: May 2, 2017

(54) SCROLL COMPRESSOR INCLUDING OLDHAM COUPLING HAVING KEYS THAT ARE SLIDINGLY RECEIVED IN SLOTS OF A NON-ORBITING SCROLL AND/OR AN ORBITING SCROLL

(71) Applicant: Emerson Climate Technologies, Inc., Sidney, OH (US)

(72) Inventors: James F. Fogt, Sidney, OH (US); Sunil S. Kulkarni, Springboro, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 89 days.

(21) Appl. No.: 14/529,219

(22) Filed: Oct. 31, 2014

(65) Prior Publication Data

US 2016/0123326 A1 May 5, 2016

(51) Int. Cl.
*F03C 2/00* (2006.01)
*F03C 4/00* (2006.01)
(Continued)

(52) U.S. Cl.
CPC .......... *F01C 17/066* (2013.01); *F01C 1/0215* (2013.01); *F01C 1/0253* (2013.01); *F04C 18/0215* (2013.01); *F04C 18/0223* (2013.01); *F04C 18/0246* (2013.01); *F04C 18/0253* (2013.01); *F04C 29/0057* (2013.01); *F04C 29/0071* (2013.01); *F04C 23/008* (2013.01); *F16D 3/04* (2013.01)

(58) Field of Classification Search
CPC F04C 18/0215; F04C 18/0253; F04C 23/008; F04C 27/005; F04C 29/0057; F04C 29/0071; F04C 18/0223; F04C 18/0246; F01C 1/0215; F01C 1/0253; F01C 17/066; F01C 1/0246; F01C 1/026; F01C 17/0669; F16D 3/04
USPC .......... 418/55.1–55.6, 57; 464/102, 104–105
See application file for complete search history.

(56) References Cited

U.S. PATENT DOCUMENTS

| | | | | |
|---|---|---|---|---|
| 4,431,380 A | * | 2/1984 | Utter | ........................ F01C 17/06 418/55.3 |
| 4,655,696 A | * | 4/1987 | Utter | ..................... F01C 17/066 418/55.3 |

(Continued)

OTHER PUBLICATIONS

Office Action regarding Chinese Patent Application No. 201520850652.4, dated Feb. 4, 2016. Translation provided by Unitalen Attorneys at Law.

(Continued)

*Primary Examiner* — Theresa Trieu
(74) *Attorney, Agent, or Firm* — Harness, Dickey & Pierce, P.L.C.

(57) ABSTRACT

A compression mechanism can include a first scroll member, a second scroll member, and an Oldham coupling. The first scroll member can include a base plate. The second scroll member can meshingly engaged with the first scroll member, and include a first radially extending slot. The Oldham coupling can include a ring portion disposed about the base plate and a first radially extending key portion disposed in the first radially extending slot. The ring portion and the key portion can include a pair of upper surfaces and a pair of lower surfaces. At least one pair of upper surfaces or lower surfaces can be substantially coplanar.

24 Claims, 4 Drawing Sheets

(51) Int. Cl.
  *F04C 2/00*    (2006.01)
  *F04C 18/00*   (2006.01)
  *F01C 17/06*   (2006.01)
  *F01C 1/02*    (2006.01)
  *F04C 18/02*   (2006.01)
  *F04C 29/00*   (2006.01)
  *F04C 23/00*   (2006.01)
  *F16D 3/04*    (2006.01)

(56) References Cited

U.S. PATENT DOCUMENTS

| | | | |
|---|---|---|---|
| 5,320,506 A | 6/1994 | Fogt | |
| 5,582,512 A * | 12/1996 | Bush | F01C 17/066 418/55.3 |
| 8,734,142 B2 | 5/2014 | Kiem et al. | |
| 2002/0114721 A1 * | 8/2002 | Fenocchi | F01C 17/066 418/55.3 |
| 2013/0004355 A1 | 1/2013 | Kiem et al. | |
| 2013/0209304 A1 | 8/2013 | Li et al. | |

OTHER PUBLICATIONS

Koo, In Hwe and Shin, Dong Koo, "Shape Optimization of Oldham Coupling in Scroll Compressor" International compressor Engineering Conference. (2004) pp. 1-8. Paper 1645.

* cited by examiner

SCROLL COMPRESSOR INCLUDING OLDHAM COUPLING HAVING KEYS THAT ARE SLIDINGLY RECEIVED IN SLOTS OF A NON-ORBITING SCROLL AND/OR AN ORBITING SCROLL

FIELD

The present disclosure relates to scroll compressor, and more particularly to an Oldham coupling for a scroll compressor.

BACKGROUND

This section provides background information related to the present disclosure which is not necessarily prior art.

A scroll compressor employs a fixed or non-orbiting scroll member and an orbiting scroll member. The non-orbiting and orbiting scroll members each include a spiral wrap. The spiral wrap of the orbiting scroll member is meshingly engaged with the spiral wrap of the non-orbiting scroll member to define a series of fluid pockets therebetween. A driveshaft, having a crankpin that is eccentrically mounted relative to a central axis of the orbiting scroll member, causes the orbiting scroll member to orbit about the central axis. The volume of the fluid pockets will increase and decrease as the orbiting scroll member orbits about the central axis. In order to prevent relative rotation between the orbiting and non-orbiting scroll members as the orbiting scroll member orbits about the central axis, an Oldham coupling may be employed. The Oldham coupling may be engaged with the orbiting and non-orbiting scroll members.

SUMMARY

This section provides a general summary of the disclosure, and is not a comprehensive disclosure of its full scope or all of its features.

In one configuration, a compression mechanism is provided. The compression mechanism can include a first scroll member, a second scroll member, and an Oldham coupling. The first scroll member can include a base plate. The second scroll member can meshingly engaged with the first scroll member, and include a first radially extending slot. The Oldham coupling can include a ring portion disposed about the base plate and a first radially extending key portion disposed in the first radially extending slot. The ring portion and the key portion can include a pair of upper surfaces and a pair of lower surfaces. At least one pair of upper surfaces or lower surfaces can be substantially coplanar.

In some configurations, the second scroll member can further include a second radially extending slot, and the Oldham coupling can further include a second radially extending key portion disposed in the second radially extending slot.

In some configurations, an outer periphery of the base plate can include a first straight segment opposing a second straight segment, and a first arcuate segment opposing a second arcuate segment.

In some configurations, an inner periphery of the ring portion can include a third straight segment opposing a fourth straight segment, and a third arcuate segment opposing a fourth arcuate segment.

In some configurations, the first and second arcuate segments have a first radius of curvature, and the third and fourth arcuate segments have a second radius of curvature larger than the first radius of curvature.

In some configurations, the third straight segment can include a first radially projecting flange and the fourth straight segment includes a second radially projecting flange.

In some configurations, the first arcuate segment can include a third slot and the Oldham coupling can include a third key portion disposed in the third slot.

In some configurations, the second arcuate segment can include a fourth slot and the Oldham coupling can include a fourth key portion disposed in the fourth slot.

In some configurations, the third key portion can extend in a direction substantially parallel to the fourth key portion.

In some configurations, the third key portion can extend in a direction substantially perpendicular to the first key portion.

In some configurations, the compression mechanism can be disposed within a scroll compressor including a driveshaft rotatably engaged with the orbiting scroll member. The third key portion can extend in a direction substantially perpendicular to the axis of rotation.

In some configurations, the pair of upper surfaces can be substantially coplanar and the pair of lower surfaces can be substantially coplanar.

In another configuration, a compression mechanism is provided. The compression mechanism includes a first scroll member, a second scroll member, and an Oldham coupling. The first scroll member includes a base plate and is operable to orbit about an axis of rotation. The second scroll member is meshingly engaged with the first scroll member and includes a first radially extending slot and a second radially extending slot. The Oldham coupling includes a ring portion disposed about the base plate, a first key portion disposed in the first slot, and a second key portion disposed in the second slot. The ring portion includes a first upper surface adjacent the second scroll member. The first key portion includes a second upper surface. The second key portion includes a third upper surface. At least one of the second upper surface and the third upper surface is substantially coplanar with the first upper surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a bottom view of another configuration of an Oldham coupling engaged with an orbiting scroll member and a non-orbiting scroll member according to the principles of the present disclosure.

Corresponding reference numerals indicate corresponding parts throughout the several views of the drawings.

DETAILED DESCRIPTION

Figure 1:
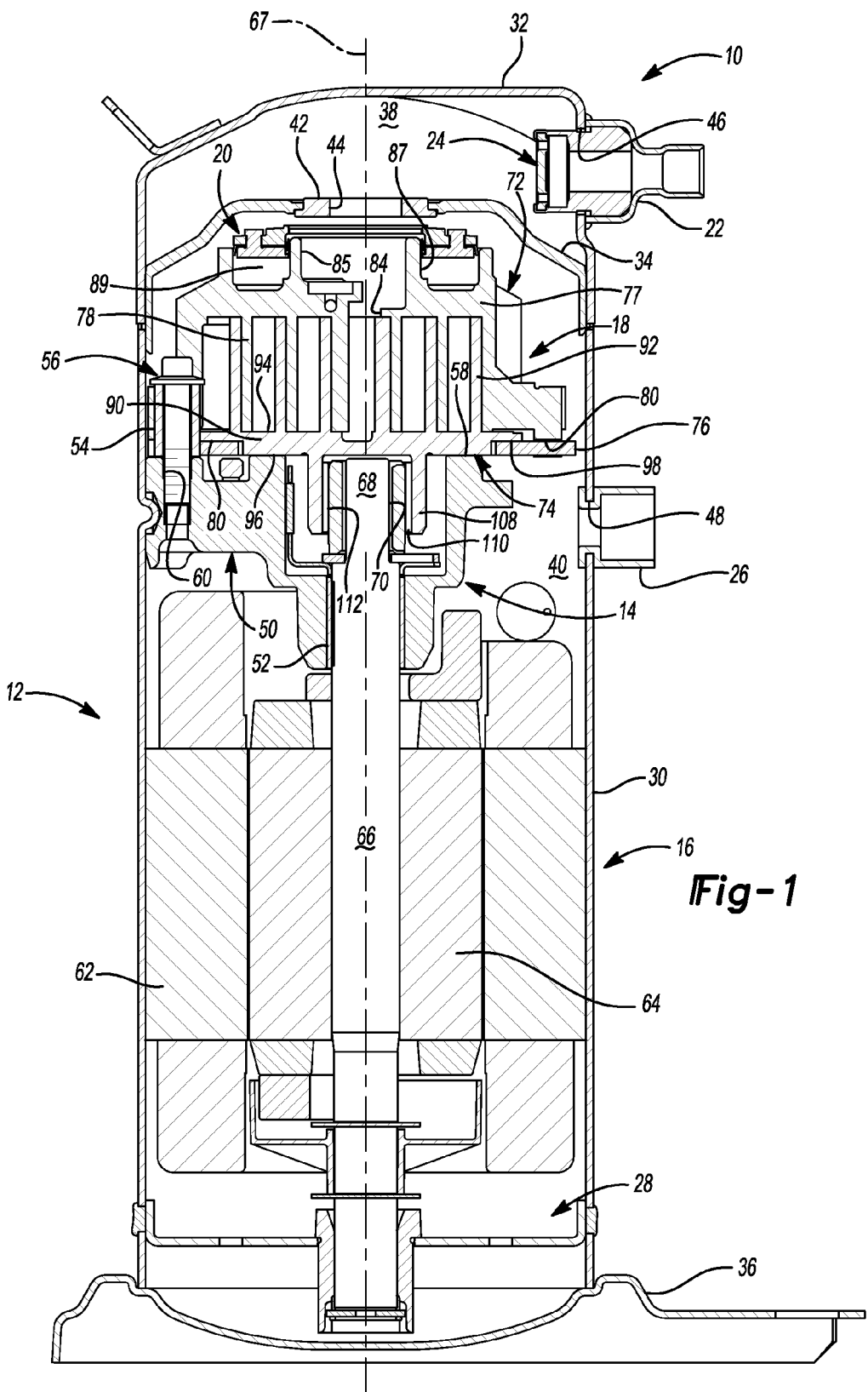
FIG. 1 is a cross-sectional view of a compressor having an Oldham coupling according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a compressor 10 is shown. The compressor 10 may include a hermetic shell assembly 12, a first bearing housing assembly 14, a motor assembly 16, a compression mechanism 18, a seal assembly 20, a discharge fitting 22, a discharge valve assembly 24, a suction inlet fitting 26, and a second bearing housing assembly 28. While the compressor 10 is shown as a low-side scroll compressor, it will be appreciated that the teachings herein can also be applied to a high-side compressor, where the motor assembly 16 is located in a discharge pressure chamber.

The shell assembly 12 may form a compressor housing and may include a cylindrical shell 30, an end cap 32 at an upper end thereof, a transversely extending partition 34, and a base 36 at a lower end thereof. The end cap 32 and the partition 34 may define a discharge chamber 38. The partition 34 may separate the discharge chamber 38 from a suction chamber 40. The partition 34 may include a wear ring 42 and a discharge passage 44 extending therethrough to provide communication between the compression mechanism 18 and the discharge chamber 38. The discharge fitting 22 may be attached to shell assembly 12 at an opening 46 in the end cap 32. The discharge valve assembly 24 may be disposed within the discharge fitting 22 and may generally prevent a reverse flow condition. The suction inlet fitting 26 may be attached to shell assembly 12 at an opening 48.

The first bearing housing assembly 14 may be fixed relative to the shell 30 and may include a main bearing housing 50, a first bearing 52, sleeves guides or bushings 54, and fastener assemblies 56. The main bearing housing 50 may house the first bearing 52 therein and may include an thrust bearing surface 58 on an axial end surface thereof. The main bearing housing 50 may include apertures 60 extending therethrough and receiving the fastener assemblies 56.

The motor assembly 16 may include a motor stator 62, a rotor 64, and a drive shaft 66. The motor stator 62 may be press fit into the shell 30. The rotor 64 may be press fit on the drive shaft 66 and may transmit rotational power to the drive shaft 66. The drive shaft 66 may be rotatably supported within the first and second bearing housing assemblies 14, 28 for rotation about an axis 67. The drive shaft 66 may include an eccentric crank pin 68 having a flat 70 thereon.

The compression mechanism 18 may include a non-orbiting scroll 72 and an orbiting scroll 74. An Oldham coupling 76 may be engaged with the non-orbiting and orbiting scrolls 72, 74 to prevent relative rotation therebetween.

The non-orbiting scroll 72 may include an end plate 77, a spiral wrap 78, and at least one slot 80. The spiral wrap 78 may project downwardly from the end plate 77. The end plate 77 may include a discharge passage 84, a discharge recess 85 and an annular recess 87. The discharge passage 84 is in communication with one of the fluid pockets at the radially inner position and allows compressed working fluid (at the discharge pressure) to flow through the discharge recess 85 and into the discharge chamber 62. The annular recess 87 may encircle the discharge recess 85 and may be substantially concentric therewith. The annular recess 87 may at least partially receive the seal assembly 20 and may cooperate with the seal assembly 20 to define an axial biasing chamber 89 therebetween.

As illustrated, in one configuration, the non-orbiting scroll 72 includes two slots 80. The slots 80 are generally disposed on opposite sides of the non-orbiting scroll 72. The slots 80 may be radially extending and radially aligned with each other. As illustrated, in one configuration, the non-orbiting scroll 72 may include a first pair of axially extending projections or flanges 86a, 86b and a second pair of axially extending projections or flanges 88a, 88b. Each slot 80 may be at least partially defined by each of the first and second pairs of axially extending projections 86a, 86b and 88a, 88b.

The orbiting scroll 74 may include an end plate 90 having a spiral wrap 92 extending from an upper surface 94 thereof and a base or thrust plate 96 extending from a lower surface 98 thereof. The spiral wrap 92 may meshingly engage the spiral wrap 78 of the non-orbiting scroll 72, thereby creating a series of moving fluid pockets. The fluid pockets defined by the spiral wraps 78, 92 may decrease in volume as they move from a radially outer position (at a suction pressure) to a radially intermediate position (at an intermediate pressure) to a radially inner position (at a discharge pressure) throughout a compression cycle of the compression mechanism 18.

The thrust plate 96 may interface with the thrust bearing surface 58 on the main bearing housing 50. While the end plate 90 and the thrust plate 96 are described herein as being separate components, it will be appreciated that the end plate 90 and the thrust plate 96 may be integrally formed as a monolithic construct. An outer periphery of the thrust plate 96 may be non-circular in shape and defined by two generally circular arc segments 100, 102, each of a substantially constant radius R1. Opposed ends of the arc segments 100, 102 may be interconnected by substantially straight segments 104, 106 of a length L1. The straight segment 104 may be substantially parallel to the straight segment 106. In this regard, the periphery of the thrust plate 96 may be substantially stadium-shaped. A cylindrical hub 108 may project downwardly from the thrust plate 96 and may include a drive bushing 110 disposed therein. The drive bushing 110 may include an inner bore 112 in which the crank pin 68 is drivingly disposed. The flat 70 of the crank pin 68 is drivingly engaged with a flat surface in a portion of the inner bore 112 to provide a radially compliant driving arrangement.

Figure 2:
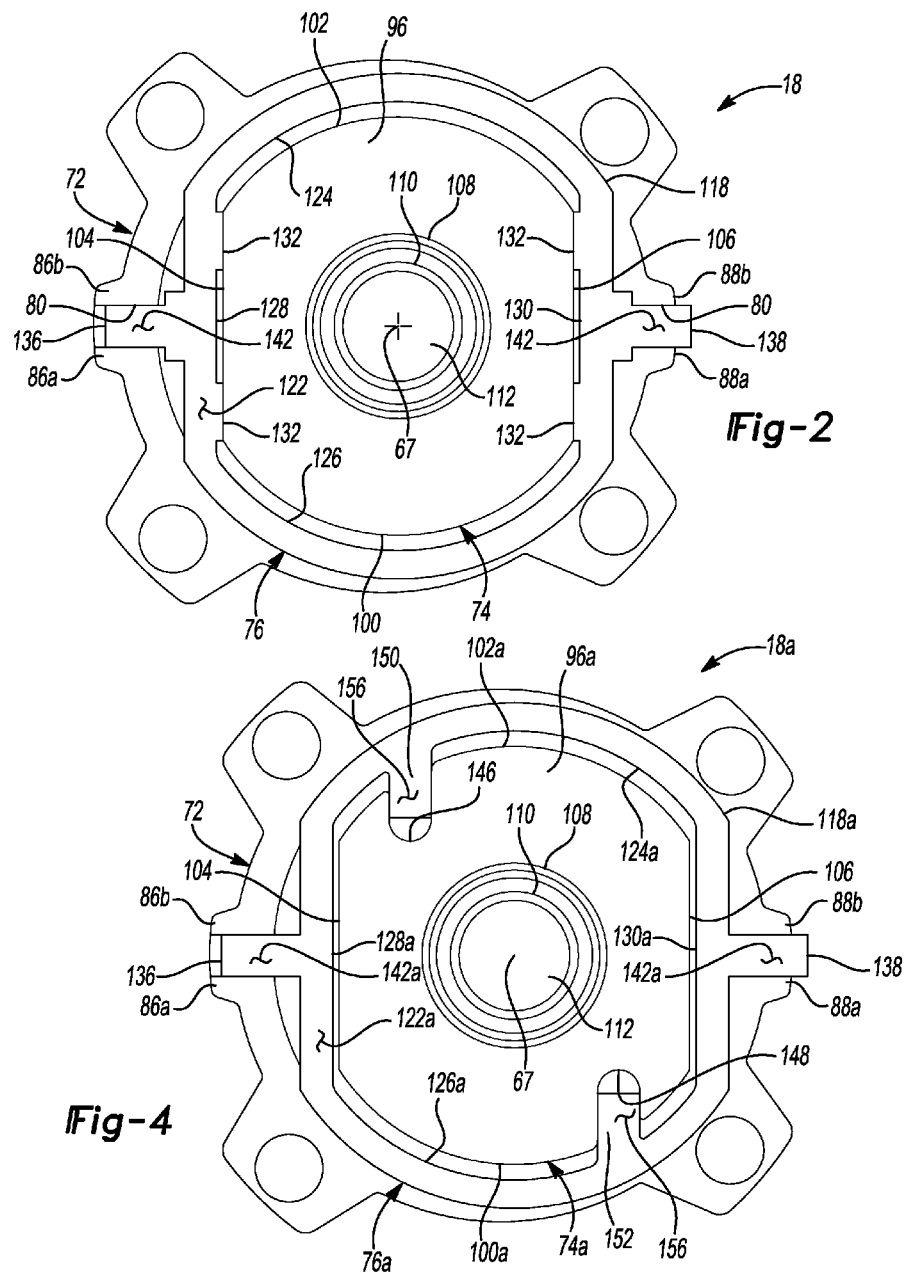
FIG. 2 is a bottom view of the Oldham coupling of FIG. 1 operably coupled to an orbiting scroll member and a non-orbiting scroll member.
Figure 3:
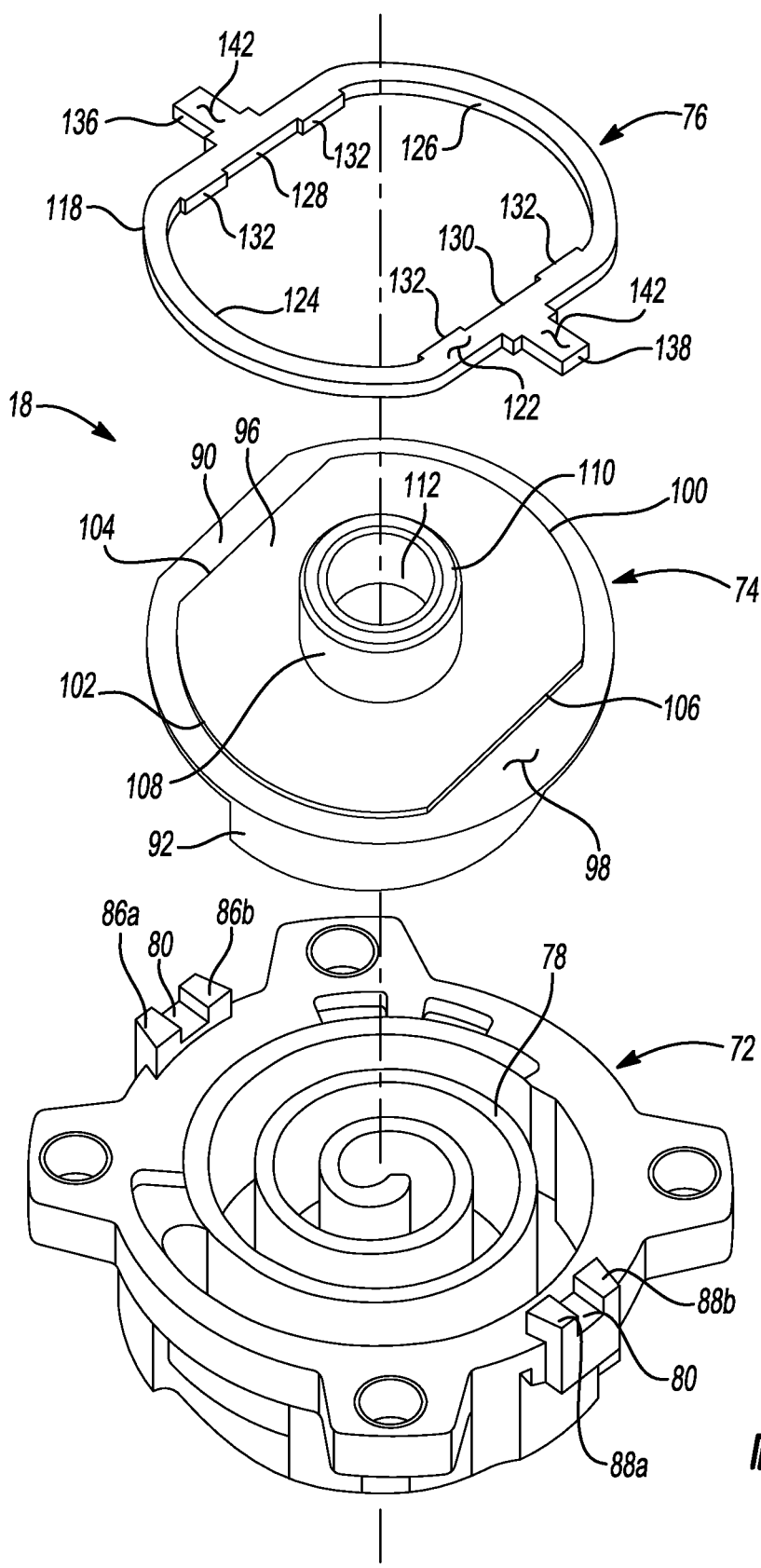
FIG. 3 is an exploded view of the Oldham coupling, orbiting scroll member, and non-orbiting scroll member of FIG. 2.

With reference to FIGS. 2 and 3, the Oldham coupling 76 may include an annular ring portion 118 having an upper surface (not shown) and a lower surface 122. The upper surface and the lower surface 122 may each be substantially planar and parallel to each other. An inner periphery of the annular ring portion 118 may be non-circular in shape, and defined by two generally circular arc segments 124, 126 each of a substantially constant radius R2. The radius R2 of arcs 124 and 126 may be approximately equal to the radius R1 of arcs 100, 102 on the thrust plate 96, plus a small clearance. Opposed ends of arc segments 124, 126 may be interconnected by substantially straight segments 128, 130 of a length L2. In this regard, the inner periphery of the annular ring portion 118 may be substantially stadium-shaped. Each of the straight segments 128, 130 may include at least one inwardly projecting flange portion 132. In one configuration, each of the straight segments 128, 130 includes two inwardly projecting flange portions 132. In an assembled configuration, the outer periphery of the thrust plate 96 may be disposed within the inner periphery of the ring portion 118, such that the flange portions 132 are adjacent to the straight segments 104, 106 of the thrust plate 96.

The Oldham coupling 76 may further include a pair of keys 136, 138 provided on an outer periphery of the annular ring portion 118. The keys 136, 138 may be provided in a diametrically aligned relationship, projecting radially outwardly from the outer periphery of the annular ring portion 118, and sized to be slidingly received within the slots 80 on the non-orbiting scroll 72. In this regard, the keys 136, 138 may be aligned along a line extending perpendicular to the straight segments 128, 130. The keys 136, 138 may include an upper surface (not shown) and a lower surface 142. The upper surface of the keys 136, 138 may be co-planar with the upper surface of the ring portion 118. The lower surface 142 of the keys 136, 138 may be co-planar with the lower surface 122 of the ring portion 118.

The co-planar configuration of the upper surface of the keys 136, 138 and the upper surface of the ring portion 118, the co-planar configuration of the lower surfaces 122, 142, as well as the radially extending configurations of the keys 136, 138, enables the size of Oldham coupling 76 to be minimized for a given size compressor. These configurations also ensure that any torque vectors generated by the movement between the orbiting scroll 74 and the Oldham coupling 76 and between the non-orbiting scroll 72 and the Oldham coupling 76 are substantially aligned with the axis 67 of the drive shaft 66. In this way, frictional forces and undesirable vibrations between the orbiting scroll 74 and the Oldham coupling 76 and between the non-orbiting scroll 72 and the Oldham coupling 76 are also minimized. It will also be appreciated that the co-planar configuration of the upper surface of the keys 136, 138 and the upper surface of the ring portion 118 and the co-planar configuration of the lower surfaces 122, 142, as well as the diametrically aligned configuration of the keys 136, 138 with the slots 80 allows the Oldham coupling 76 to be reversibly mounted relative to the non-orbiting scroll 72 and the orbiting scroll 74. Accordingly, in a first assembled configuration, the upper surface of the Oldham coupling 76 may be adjacent to the lower surface 98 of the end plate 90 (FIG. 2), and in a second assembled configuration, the lower surface 122 of the Oldham coupling 76 may be adjacent to the lower surface 98 of the end plate 90.

Figure 5:
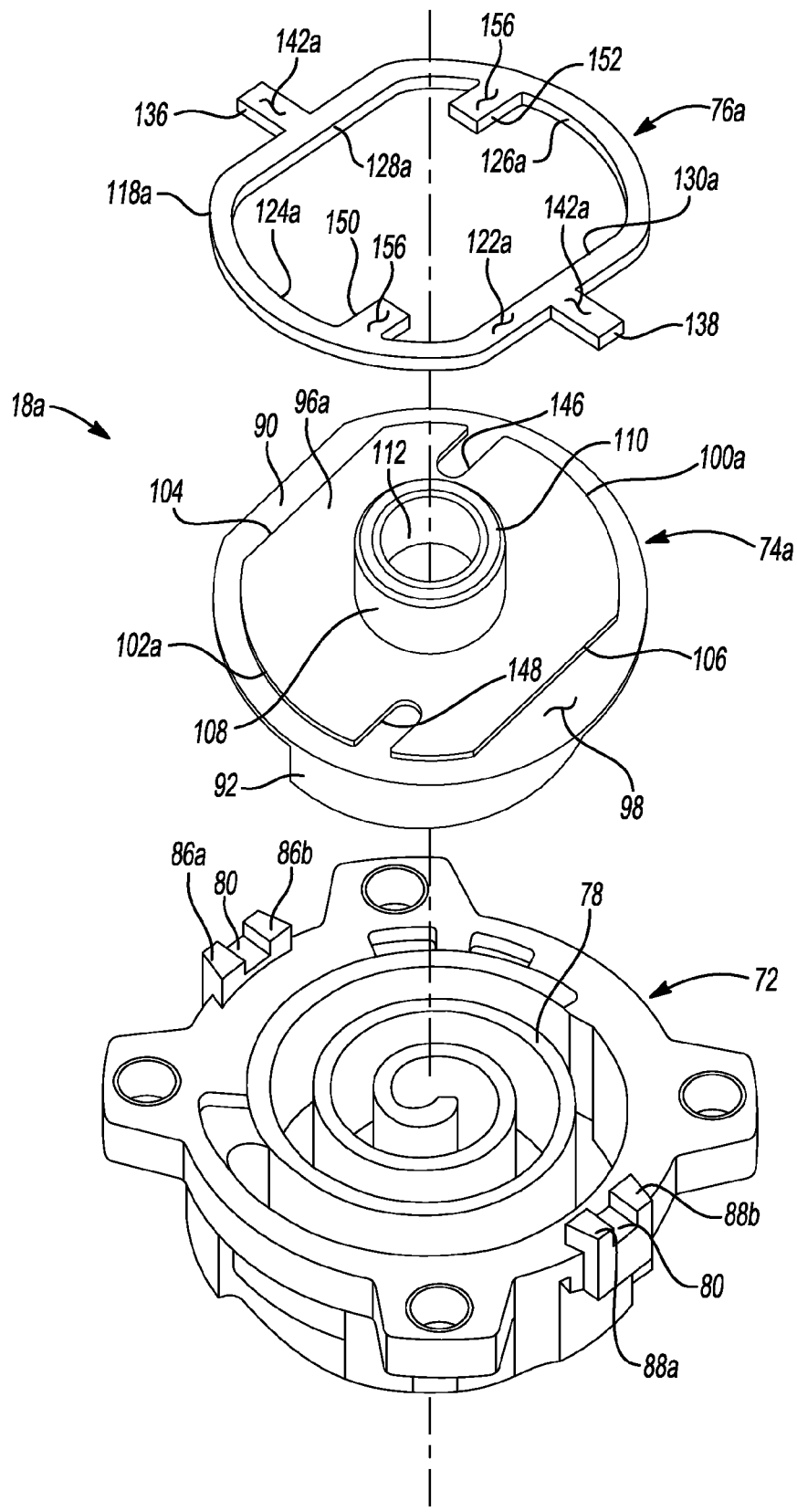
FIG. 5 is an exploded view of the Oldham coupling, orbiting scroll member, and non-orbiting scroll member of FIG. 4.

With reference to FIGS. 4 and 5, another configuration of a compression mechanism 18a is shown. The compression mechanism 18a may be substantially similar to the compression mechanism 18, except as otherwise provided herein. Accordingly, like reference numerals will be used to describe like features. The compression mechanism 18 may include an orbiting scroll 74a and an Oldham coupling 76a.

The orbiting scroll 74a may include an annular flat thrust plate 96a on the lower surface 98 of the end plate 90. The outer periphery of the thrust plate 96a may be non-circular in shape and defined by two generally circular arc segments 100a, 102a, each of radius R1. Each of the arc segments 100a and 102a may include an outwardly opening slot 146, 148, respectively. The slots 146, 148 may project inwardly from the arc segments 100a, 102a in a direction substantially parallel to the straight segments 104, 106. In addition, slot 146 may be offset from slot 148 and the axis 67 in a direction substantially perpendicular to the straight segments 104, 106. The slots 146, 148 may each be offset from the axis 67 by the same distance, in opposite directions, such that the slots are symmetrically disposed relative to the axis 67.

The Oldham coupling 76a may include an annular ring portion 118a having an upper surface (not shown) and a lower surface 122*a*. The upper surface of the annular ring portion 118*a* and lower surface 122*a* may be substantially planar and parallel to each other. The inner periphery of the annular ring portion 118*a* may be non-circular in shape, defined by two generally circular arc segments 124*a*, 126*a*, each of radius R2. Opposed ends of the arc segments 124*a*, 126*a* may be interconnected by substantially straight segments 128*a*, 130*a* of length L2. Each of the arc segments 124*a*, 126*a* may include an inwardly projecting key 150, 152, respectively, sized to be slidingly received within the slots 146, 148 on the orbiting scroll 74*a*. In this regard, the keys 150, 152 may project inwardly from the inner periphery of the ring portion 118*a* in a direction substantially parallel to the straight segments 128*a*, 130*a*. In addition, key 150 may be offset from key 152 and the axis 67 in a direction substantially perpendicular to the straight segments 128*a*, 130*a*. The keys 150, 152 may each be offset from the axis 67 by the same distance, in opposite directions, such that the keys 150, 152 are symmetrically disposed relative to the axis 67. The keys 150, 152 may each include an upper surface (not shown) and a lower surface 156. The upper surface of the keys 150, 152 may be co-planar with the upper surface of the keys 136, 138 and with the upper surface of the ring portion 118*a*. The lower surface 156 of the keys 150, 152 may be co-planar with the lower surface 142*a* of the keys 136, 138 and with the lower surface 122*a* of the ring portion 118*a*.

The co-planar configuration of the upper surfaces of the keys 150, 152, the keys 136, 138, and the annular ring portion 118*a*, the co-planar configuration of the lower surfaces 122*a*, 142, 156, and the inwardly extending configuration of the keys 150, 152, enables the size of the Oldham coupling 76*a* to be minimized for a given size compressor. These configurations also ensure that any torque vectors generated by the movement between the orbiting scroll 74*a* and the Oldham coupling 76*a* and between the non-orbiting scroll 72 and the Oldham coupling 76*a* are substantially aligned with the axis 67 of the drive shaft 66. In this way, frictional forces and undesirable vibrations between the orbiting scroll 74*a* and the Oldham coupling 76*a* and between the non-orbiting scroll 72 and the Oldham coupling 76*a* are also minimized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compression mechanism comprising:
   an orbiting scroll member including a base plate;
   a non-orbiting scroll member meshingly engaged with the orbiting scroll member, the non-orbiting scroll member including a first radially extending slot; and
   an Oldham coupling including a ring portion disposed about the base plate and a first radially extending key portion disposed in the first radially extending slot, the ring portion having a first upper surface and a first lower surface, and the key portion having a second upper surface and a second lower surface, wherein at least one of:
   the second upper surface is coplanar with the first upper surface; and
   the second lower surface is coplanar with the first lower surface.

2. The compression mechanism of claim 1, wherein the non-orbiting scroll member further includes a second radially extending slot, and the Oldham coupling further includes a second radially extending key portion disposed in the second radially extending slot.

3. The compression mechanism of claim 1, wherein an outer periphery of the base plate includes a first straight segment opposing a second straight segment, and a first arcuate segment opposing a second arcuate segment.

4. The compression mechanism of claim 3, wherein an inner periphery of the ring portion includes a third straight segment opposing a fourth straight segment, and a third arcuate segment opposing a fourth arcuate segment.

5. The compression mechanism of claim 4, wherein the first and second arcuate segments have a first radius of curvature, and the third and fourth arcuate segments have a second radius of curvature larger than the first radius of curvature.

6. The compression mechanism of claim 5, wherein the third straight segment includes a first radially projecting flange and the fourth straight segment includes a second radially projecting flange.

7. The compression mechanism of claim 5, wherein the first arcuate segment includes a third slot and the Oldham coupling includes a third key portion disposed in the third slot.

8. The compression mechanism of claim 7, wherein the second arcuate segment includes a fourth slot and wherein the Oldham coupling includes a fourth key portion disposed in the fourth slot.

9. The compression mechanism of claim 8, wherein the third key portion extends in a direction parallel to the fourth key portion.

10. The compression mechanism of claim 7, wherein the third key portion extends in a direction perpendicular to the first radially extending key portion.

11. The compression mechanism of claim 7, wherein the compression mechanism is disposed within a scroll compressor including a driveshaft engaged with the orbiting scroll member and rotatable about an axis of rotation, and wherein the third key portion extends in a direction perpendicular to the axis of rotation.

12. The compression mechanism of claim 1, wherein the compression mechanism is disposed within a scroll compressor.

13. The compression mechanism of claim 12, wherein the scroll compressor includes a driveshaft engaged with the orbiting scroll member and rotatable about an axis of rotation, and wherein the first radially extending key portion extends in a direction perpendicular to the axis of rotation.

14. The compression mechanism of claim 1, wherein the second upper surface is coplanar with the first upper surface, and the second lower surface is coplanar with the first lower surface.

15. A compression mechanism comprising:
    an orbiting scroll member including a base plate, the orbiting scroll member operable to orbit about an axis of rotation;
    a non-orbiting scroll member meshingly engaged with the orbiting scroll member, the non-orbiting scroll member including a first radially extending slot and a second radially extending slot; and an Oldham coupling including a ring portion disposed about the base plate, a first key portion disposed in the first radially extending slot, and a second key portion disposed in the second radially extending slot, the ring portion including a first upper surface adjacent the non-orbiting scroll member, the first key portion including a second upper surface, and the second key portion including a third upper surface, at least one of the second upper surface and the third upper surface is coplanar with the first upper surface.

16. The compression mechanism of claim 15, wherein an outer periphery of the base plate includes a first straight segment opposing a second straight segment, and a first arcuate segment opposing a second arcuate segment.

17. The compression mechanism of claim 16, wherein an inner periphery of the ring portion includes a third straight segment opposing a fourth straight segment, and a third arcuate segment opposing a fourth arcuate segment.

18. The compression mechanism of claim 17, wherein the first and second arcuate segments have a first radius of curvature, and the third and fourth arcuate segments have a second radius of curvature larger than the first radius of curvature.

19. The compression mechanism of claim 18, wherein the first arcuate segment includes a third slot, and wherein the Oldham coupling includes a third key portion disposed in the third slot.

20. The compression mechanism of claim 19, wherein the third key portion extends in a substantially perpendicular to the first key portion.

21. The compression mechanism of claim 15, wherein the compression mechanism is disposed within a scroll compressor.

22. The compression mechanism of claim 15, wherein the second upper surface and the third upper surface are coplanar with the first upper surface.

23. The compression mechanism of claim 15, wherein the ring portion includes a first lower surface, the first key portion includes a second lower surface, and the second key portion includes a third lower surface, and wherein at least one of the second lower surface and the third lower surface is coplanar with the first lower surface.

24. The compression mechanism of claim 23, wherein the second lower surface and the third lower surface are coplanar with the first lower surface.

\* \* \* \* \*